June 8, 1937.  B. VAURS  2,083,045
LOCKING DEVICE FOR NUTS
Filed Oct. 17, 1934
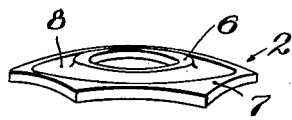
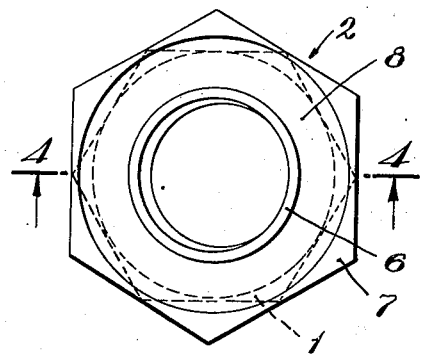
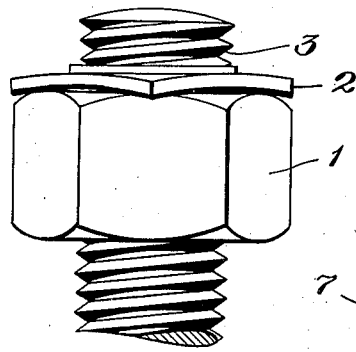
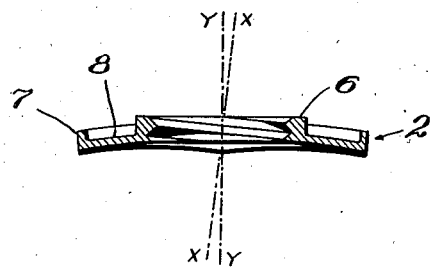
INVENTOR
BAPTISTE VAURS
BY
Kiddle, Bethell & Montgomery
ATTORNEYS Patented June 8, 1937

2,083,045

UNITED STATES PATENT OFFICE 2,083,045

LOCKING DEVICE FOR NUTS

Baptiste Vaurs, Paris, France, assignor to Societe de Boulonnerie et de Matricage de Precision, Paris, France Application October 17, 1934, Serial No. 748,723
In France April 20, 1934

2 Claims. (Cl. 151—30)

The present invention relates to washers for preventing nuts from slackening.

Means are provided for permitting the washers to be tightened.

In the accompanying drawing:—

Figure 1 is a perspective view of an incurved washer constructed according to the invention.

Figure 2 is a view showing the arrangement formed by a bolt, an ordinary nut and the washer according to the invention.

Figure 3 is a plan view of the arrangement shown in Fig. 2; and

Figure 4 is a view on the line 4—4 of Fig. 3.

As shown in the drawing, the central part 6 of the washer 2 is given a thickness equal to the pitch of the bolt 3. The part 7 at the edge of the washer 2 which may be cut with six sides having flats slightly overlapping the angles of the nut has also a sufficient thickness (for example equal to the thickness of the part 6) so that the washer can withstand the force exerted by means of a tightening tool, such as a spanner.

Between the parts 6 and 7 is situated an annular zone 8, the thickness of which is less than that of the parts 6 and 7, this thickness being provided so that the washers will have a sufficient elasticity to lock the washer on the nut.

Further, the washer is shaped in such a manner that its enveloping geometrical cone has, at its base, an angle varying according to the diameters of the bolts.

In order to render this locking action still more effective, the operation of tapping the washer is effected with a slight inclination relative to the plane of the said washer, as can be seen in Figure 4, on which the tapping axis is indicated by X—X, and the axis of the washer is indicated at Y—Y; the washer, consequently, acts at a slight inclination on the bolt 3, and when it is clamped upon the bolt the lowest point of the washer comes first into contact with the nut and then the whole annular surface of the washer is progressively applied upon the nut by the elastic deformation of the part 8 of the washer.

At the same time a deformation of the internal thread of the washer is produced and this deformation, in combination with the elastic deformation of the washer, effectively locks the washer upon the nut without damage to the threads either of the bolt or of the washer.

The washers 2 may have any desired contour, and may comprise any particular means for permitting them to be tightened. Further, their contour may have six flats as in Figures 1, 2 and 3, in order to permit them to be tightened with an ordinary spanner, or they may have any other desired shape.

What I claim is:

1. A device for locking nuts upon a bolt, said device comprising an elastic metal washer, the peripheral and central portions of the washer being of greater rigidity than the intermediate portion, the base of said washer being dome-shaped for engagement with the adjacent face of a nut to be locked, said central portion of the washer being provided with a hole the axis of which has a slight inclination to the base plane of the said washer, said hole being provided with a continuous unbroken thread for threaded engagement with the threads of a bolt carrying the nut to be locked.

2. A device for locking nuts comprising a washer the base of which is dome-like, said washer having a rigid periphery and a rigid central portion, the washer thus being shaped to provide an elastic annular cup-shaped portion of less thickness than the said peripheral and central portions intermediate the said rigid central and peripheral portions, a thread tapped through the said central portion of the washer having a length at least equal to the pitch of the thread, the axis of such tapped thread having a slight inclination to the base plane of the said washer.

BAPTISTE VAURS.